Feb. 11, 1958 E. P. KENNEDY 2,822,722

MOTOR SYNCHRONIZING SYSTEM FOR MOTION PICTURE AND MAGNETIC SOUND TAPE APPARATUS

Filed July 2, 1953

2 Sheets-Sheet 1

*INVENTOR,*
EDWARD P. KENNEDY

*BY* Harry M. Saragovitz

*ATTORNEY*

INVENTOR.
EDWARD P. KENNEDY
BY
Harry M. Saragovitz
ATTORNEY

United States Patent Office 2,822,722

Patented Feb. 11, 1958

2,822,722

MOTOR SYNCHRONIZING SYSTEM FOR MOTION PICTURE AND MAGNETIC SOUND TAPE APPARATUS

Edward P. Kennedy, West End, N. J., assignor to the United States of America as represented by the Secretary of the Army Application July 2, 1953, Serial No. 365,793

1 Claim. (Cl. 88—16.2)

Figure 1:
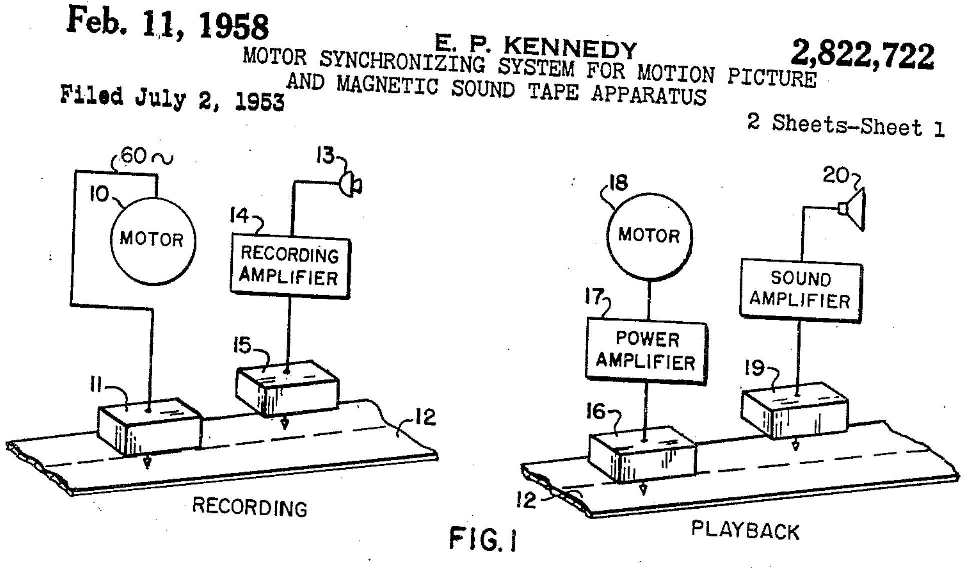

(Granted under Title 35, U. S. Code (1952), sec. 266)

The invention described herein may be manufactured and used by or for the Government for governmental purposes without the payment of any royalty thereon.

This invention relates to a precisely functioning apparatus for controlling the speed of an electric motor to function in timed relation to but without mechanical interconnection between another device whose pattern of operation must be followed in predetermining time sequence to the motor.

The invention is particularly useful in the control of motors used in the recording, rerecording or reproduction of sound motion pictures, teletypewriters, facsimile equipment and similarly controlled apparatus.

The invention will herein be described in connection with the recording and reproducing of sound motion pictures by way of example. The example presented utilizes the great flexibility and high fidelity sound quality obtainable with the sound reproducer employing magnetic tape as the vehicle. In prior systems of this type attempts to obtain true synchronism have been made by using the so-called constant reference system in which the speed of the tape and that of the film are constantly compared. Means are then applied to integrate their differences. In such a system the apparatus is practically constantly speeding up or slowing down. This produces a hunting action which is very undesirable. The hunting may and often does cause the apparatus to vary its speed beyond that of discernible sound imperfections especially in musical pitch.

The present invention achieves unvarying synchronization between true sound and its accompanying picture and further insures perfect reproduction by utilizing the sound element as the medium which controls the picture timing. It is recognized that comparatively greater errors of timing are tolerated by the eye than are tolerated by the ear. It is also a fact that tape sound reproducing apparatus is available which will maintain tone quality well within maximum quality limits.

By combining the use of tape sound reproduction and an invariable picture synchronizing device actuated by an inertialess means directly from a timing signal on the tape, a final result is achieved, the perfection of which is limited only by the inherent quality of the recording and reproducing elements themselves.

Among the many advantages that stem from such a system is the highly flexible control of the film while being projected or edited. Synchronism is automatically held during forward and reverse starting and stopping as will be pointed out hereinafter.

The many other aspects of the invention which demonstrate its versatility will be subsequently pointed out.

The apparatus of the invention comprises essentially taking means for sound and picture, a reproducing means for sound and picture and a nonmechanical inertialess synchronizing means, the function of which is equivalent to the sprocket and perforated film strip used when the sound is recorded on a sound track integral with the film strip.

The taking means consists of a conventional motion picture camera driven by a synchronous motor preferably from a suitable source of power such as a commercial 60 cycle alternating current supply line and a recording device using a magnetic tape as the recording vehicle. The recording device may have two recording heads, one recording sound from a microphone upon a portion of the tape and the other head being driven by the 60 cycle supply line to record a synchronizing signal upon the remaining portion of the tape. This latter signal obviously remains in invariable physical position with respect to the sound record. Many other methods of recording the synchronizing signal may be used some of which will be pointed out subsequently.

The playback means consists essentially of a motion picture projector driven by a 60 cycle synchronous motor, a loud speaker for reproducing the sound track on the tape and a power amplifier preferably of the magnetic type for amplifying the synchronizing signal the output of which is fed directly to the projector motor thus synchronously locking the timing of the picture to the sound.

It is a primary object of the invention to provide a functionally inertialess means for controlling the speed of an electric motor in positively predetermined time relation to the cycle of operation of another device mechanically isolated from the motor.

A further object of the invention is to provide a synchronous control apparatus in which simultaneous records are made of two mechanically isolated functions on a magnetic tape subsequently to be used to time the reproduction of one of the functions from the other.

A still further object of the invention is to synchronously control a motor not only at operating speed but also to maintain synchronism during forward and backward start and stop cycles.

A still further object of the invention is to provide a synchronous control apparatus which may readily be applied to existing conventional equipment.

A still further object of the invention is to provide apparatus for taking and reproducing sound and accompanying pictures in which the basic speed of the sound equipment is closely regulated and the projected picture timing is caused to synchronously follow the sound device thereby insuring high fidelity sound reproduction without tone deficiencies caused by less efficient existing control devices.

A still further object of the invention is to provide a control apparatus wherein the reliability and the excellent current amplifying and regulating properties of a magnetic amplifier are used as the sole link between a speed regulating signal and a motor on a projector or other device.

A still further object of the invention is to provide a synchronous speed regulating apparatus in which a speed signal may be used having any suitable frequency such as 720 cycles per second which may be fed directly to the regulating bridge of a Stollar regulating system.

A still further object of the invention is to provide, in a speed regulating system, a means for changing without stopping and at the will of the operator during reproduction the linear physical relationship existing between sound record and the motion picture film.

Other objects and features will more fully appear from the following description and will be particularly pointed out in the claim.

Figure 2:
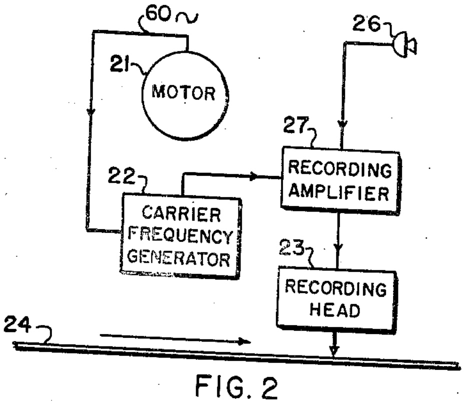
Figure 3:
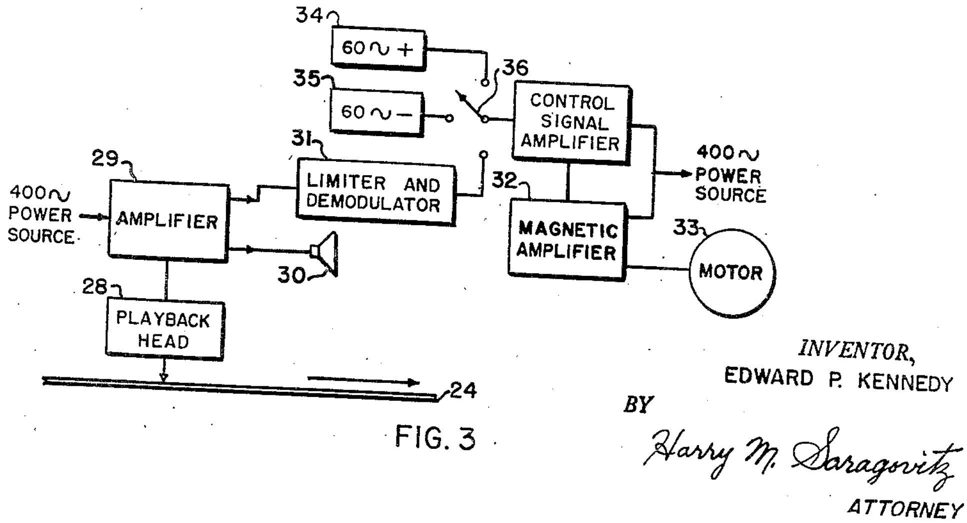
Figure 4:
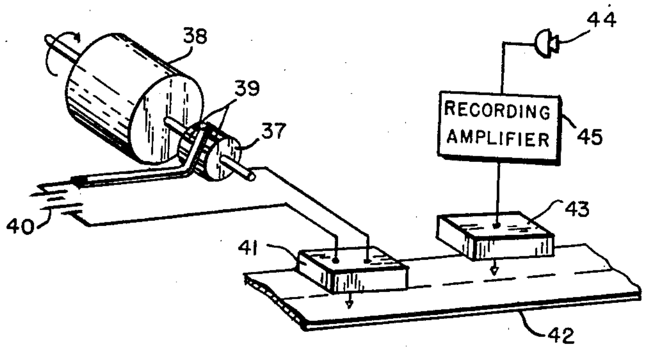
Figure 5:
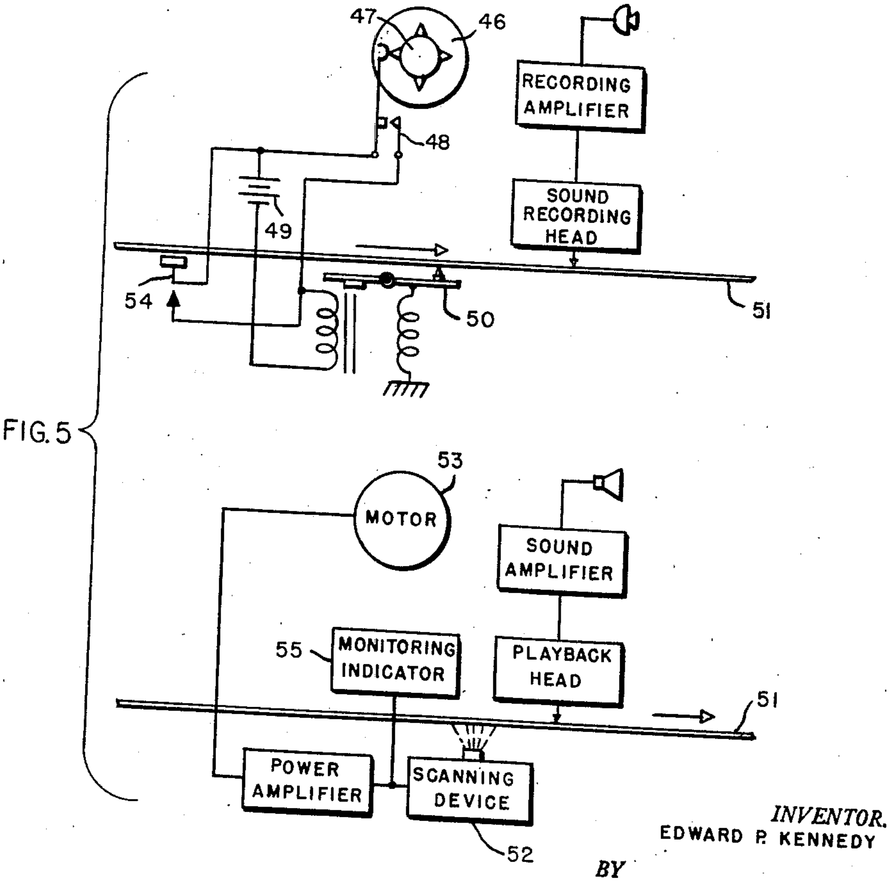

To provide a better understanding of the invention specific embodiments thereof will be described and illustrated in the drawings in which Fig. 1 illustrates diagrammatically the recording and play-back systems of a basic form of the invention; Fig. 2 illustrates another form of recording system which may be employed in the practice of the invention; Fig. 3 illustrates means for adjusting the speed of a synchronously driven member; Fig. 4 illustrates a specific means for recording a speed controlling signal upon the recording medium; Fig. 5 illustrates a method of graphically timing the recording operation and means for playing back the record synchronously with a sound record.

A basic form of the invention is shown in Fig. 1 in which taking and reproduction systems are shown in schematic block diagram. The taking system includes a conventional or any suitable motion picture camera which is driven at a controlled speed. As shown it is driven by a 60 cycle alternating current synchronous motor 10 directly connected to a sprocket shaft on the camera. The motor is energized from a suitable 60 cycle such as a commercial supply line. The same supply line is connected to a head 11, one of a pair of recording heads which are part of the equipment of a conventional magnetic tape sound recorder. Thus a time record is made upon the tape 12 desirably along one of its edges The form of the sound record may be sinusoidal or the wave may be shaped in any desired manner.

Simultaneously with the time record the sound coincident to the picture is picked up by the microphone 13 and after suitable amplification in the unit 14 it is fed to the sound recording head 15 where it is applied to the sound track on the tape 12 which is positioned along the edge of the tape opposite to the time record. In this manner the sound and timing of succeeding frames on the film strip are recorded in fixed physical relationship upon the tape and nothing can change or influence this relationship. Elongation or shrinking of the tape will not change the relationship.

There are many ways, in addition to the method above described, for creating the time and sound record some of which will be indicated hereinafter and all of which are embraced by the general principles of the invention.

As above pointed out the two records made as above described are subsequently played back by a suitable apparatus which may be a conventional type but should have high quality output and good speed regulation. The timing or frequency record is utilized to drive a frequency controlled motor which in turn drives an apparatus such as a motion picture projector to be operated in synchronism with the intelligence data such as the sound record. In this manner true inertialess synchronous operation is achieved.

Referring to the playback system shown in Fig. 1, the tape 12 is moved at its specified regulated speed which causes the reproducing head 16 to reproduce the timing or frequency signal. This signal is fed to a power amplifier 17 from where an amplified signal is fed directly to a frequency controlled motor 18 which in turn is positively mechanically connected to the device to be operated such as a motion picture projector. The output of the other reproducing head 19 is amplified and connected to a sound reproducing device such as the loudspeaker 20 or other intelligence reproducing device. Power to energize the amplifier is supplied by any suitable source.

The invention may also be practiced in the manner indicated in Fig. 2 wherein the taking system is powered by an alternating current supply such as a commercial 60 cycle supply line. This speed control system applies to a taking and reproducing operation including a device driven mechanically at a speed governed by the frequency of the power supply and a system for simultaneously recording another phenomena which is occurring coincidentally such as some form of intelligence data. An example of such a system includes a motion picture taking apparatus wherein the power supply is fed to a frequency controlled motor 21 which may be connected to a motion picture camera. The same supply is also fed to a carrier frequency generator 22 where it is used to modulate a relatively high frequency substantially higher than the normal high limit for audio signals.

The modulated signal is then fed to a recording head where it is recorded on the magnetic recording tape 24.

At the same time the intelligence such as the sound coincident to the picture is picked up by the microphone 26 and amplified by the amplifier 27 and thence fed to the recording head 23 along with the frequency pattern of the power line.

To reproduce the sound and picture is perfect synchronism the record on the tape 24 is played back by the reproducing head 28. This signal is fed to the amplifier 29 where the audio frequencies therein are separated from the carrier frequency and act to energize the loudspeaker 30. The carrier is fed to a limiter and demodulator 31 where its power line pattern is extracted and fed to a power amplifier 32 the output of which is conducted directly to a frequency controlled motor 33 which it will be noted will run in perfect synchronism with the motor 21. The operation of the system is equivalent to the conventional system wherein a sound track is made at the edge of the film strip itself. In the present system, however, all the advantages that accrue from the use of a recording tape are achieved, such as high fidelity sound and the removal of the sound track from the film thus eliminating the optical equipment necessary for conventional recording.

One of the features of the present invention is the provision of a special type of power amplifier to build the time or frequency signal to a power level required to operate a motor directly. While any amplifier may be used it has been found that a magnetic amplifier is the most highly efficient and reliable and will supply the required power in a minimum of stages of amplification.

The magnetic amplifier is of the well known type utilizing saturable reactors in connection with suitable rectifiers such as the dry disc type.

In the system presented by the present invention under normal conditions true synchronism is maintained at all times. However, under an abnormal condition such as an accidental overload on one of the motors the relation between a given frame on the film strip and the corresponding record on the magnetic tape may be shifted. Means are provided to correct this condition while the apparatus is in operation.

A frequency changing device is provided which will substitute, by manual means momentarily, an input to the magnetic amplifier 32, a signal of frequency higher than that of the power line or a signal lower than the recorded frequency. Thus, by selecting the proper frequency the picture may be brought into proper synchronism again. A suitable means for this purpose is indicated in Fig. 3 wherein a frequency source 34 having a frequency higher than the tape carrier signal and another source 35 having a frequency less than the tape carried signal. To make the correction a switch 36 is operated to connect the required corrective source to the amplifier 32 for such time as is required to overcome the maladjustment of the system.

Referring to Fig. 3 it will be noted that a 400 cycle power supply energizes the amplifier 29 and also the magnetic amplifier 32. This particular frequency is readily available in most installations using the type of equipment herein described. In this connection it has been found that the characteristics of a conventional magnetic amplifier are well adapted to this frequency and by its use a maximum degree of amplification is obtainable from the amplifier. The various elements of the invention, however, are not restricted to the use of any specific frequency.

The operation of the apparatus may be efficiently adapted to employ any suitable modulation frequency when recording the speed controlling signal upon the recording tape. The widely used 60 cycle supply line may be employed as well as any of the commercial frequencies found thruout the world.

The invention may assume a form wherein in the taking system a motion picture camera or other device is driven by a spring motor as in the conventional hand camera. In this form of the invention which is illustrated schematically in Fig. 4 a record is made on the magnetic tape as before containing a pattern which represents the frame speed of the film and a record of the accompanying intelligence such as the coincident sound.

The frame speed wave pattern may be generated in any suitable manner such as by securing a light beam chopper upon one of the sprocket shafts of the camera and causing the interrupted light beam to excite a photo cell. Thus a pulse pattern proportional to the camera speed becomes available for recording on the tape.

As illustrated in Fig. 4 the time pattern is created by a commutator 37 secured to the shaft of a spring motor 38 which drives the motion picture camera or other device. The number of the segments 39 on the commutator is chosen to produce the required pulse rate at the normal speed of the motor 38. The commutator interrupts the current from a battery 40 connected in a circuit which actuates the recording head 41. Thus the record of the camera frame speed is recorded upon one portion of the magnetic tape 42 or is applied thereto in any of the ways herein set forth.

The coincident sound record is made by the recording head 43 upon another portion of the tape. The head 43 is energized by the microphone 44 and the amplifier 45. The two records are then played back in a suitable apparatus such as that shown in Fig. 1. The frame speed signal thus developed is amplified and fed directly to a frequency controlled motor simultaneously with the reproduction of the intelligence as described in connection with Fig. 1 or any of the various play-back systems presented or suggested herein.

In the spring motor system above described the quality of reproduction is dependent only upon the inherent speed regulation of the spring motor itself. If the normal speed regulation of the motor is good the reproduction will be of the same quality.

In line with the wide versatility of the invention it should be pointed out that in certain commercial recording devices a relatively high biasing frequency is put on the tape along with the sound record for reasons not directly related to the present invention. This bias frequency, therefore, can be made available as a carrier frequency and may be modulated by the frame speed controlling frequency pattern such as a 60 cycle standard supply line. During play-back the wave pattern, thus recorded, is extracted from the biasing frequency to act as the speed control medium in the same manner as described in connection with Fig. 2.

Another adaptation of the invention relates to the close speed regulation of a motor other than the true frequency controlled type. To accomplish this, advantage may be taken of an existing speed regulating system. This system is known to sound engineers as the Stollar system. In this system a motor such as a conventional compound wound motor constitutes the direct driving element to one or more units which are required to be driven at synchronous speed. This type of motor is inherently well speed regulated. However, by adapting it to the present invention its speed may be held in very close synchronism with another motor of the frequency controlled type.

The motor may have considerable horse power sufficient to drive a plurality of elements one or more of which may be the rotor of one or more selsyn generators which in turn may be connected to an unlimited number of selsyn motors which, for example, may be employed to drive a group of motion picture projectors or cameras.

Normally in this system a small alternating current generator is coupled to the armature of the motor. This generator may have any suitable frequency but is usually designed to generate 720 cycles at the desired motor speed. The output of the generator is fed to an electrical bridge circuit which in turn is sharply tuned to 720 cycles. When the bridge becomes unbalanced due to a change in motor speed the voltage developed at the bridge is amplified and applied to a speed regulating winding on the motor. Depending upon the amplitude and the phase of this regulating voltage when applied to the regulating winding the motor is speeded up or slowed down as called for by the automatic function of the circuit. In this manner the motor speed is held to very close limits.

To adapt this system for regulation by the invention it is necessary only to provide a small synchronous motor driven by the power line in use such as a commercial 60 cycle supply line. This motor is directly coupled to a small 720 cycle generator the output of which is recorded upon the recording tape along with the record of the sound or other intelligence in any of the above presented ways.

When played back the 720 cycle frequency from the tape is fed to the above described electrical bridge in the Stollar system. The output of the generator normally coupled to the motor in such a system is not used. In this manner the speed of the motor will be held closely to that of the frequency controlled motor in operation at the time the recording was made.

It is apparent that the practice of the invention permits the control of many units from one record. For example, in playing back the record, a group of reproducers such as moving picture projectors operating in conjunction with loud speakers can be synchronously driven from the tape and moreover the recording and synchronizing can be accomplished by remote control between distant points since the control is exercised thru wired circuits only.

An important characteristic of the invention is its ability to exercise complete control between the driving and driven elements of a system during forward and reverse starting and stopping of the operating elements. Such control is a valuable aid in making trial runs in editing and in other supervisory servicing.

Forward and reverse control may be obtained in any suitable manner such as by a conventional reversing switch inserted in the proper motor input leads to the projector or other driven element.

The starting and stopping control is automatic. When, for example, the play-back device is started a short period of time lapses during which its speed builds up from zero to running speed. It follows that since the time or frame speed record, previously applied to the tape, has a uniform pattern that during the build-up of speed at play-back the frequency of the output signal gradually increases from zero to running frequency. Thus a synchronous motor on the projector or other device is caused to lock into synchronism from zero to its running speed. In this manner the starting inertia load is gradually assumed by the motor thus avoiding the tendency of the motor to pull out of proper relation to the tape.

In stopping the apparatus also, automatic frame by frame relationship to the sound is maintained. When power to the play-back motor is cut off the frequency of the frame speed signal slows down from normal running frequency to zero frequency. During this period the synchronous motor remains locked in synchronism with the tape and the motor is automatically dynamically braked to a stop without losing its correct relation to the frequency pattern on the tape.

The invention may be practiced as shown in Fig. 5 wherein is shown a motor 46 which is provided with a cam 47 acting to open and close a switch 48 in the circuit of a battery 49. A magnetically operated stylus 50 is in the battery circuit and acts to make a graphic recording of the speed pattern of the motor upon the base portion of the tape 51.

In playing back this record the output of a scanner 52 is amplified and fed to a frequency controlled motor 53.

A hand operated switch 54 may be used to add special timing indications to the record while it is being made and subsequently these special indices may be viewed in a monitoring device 55 when the record is played back.

Sound is recorded and played back in the same manner as described in connection with the other forms of the device.

In the equipment above described the number of phases of the power supply has been specified. The apparatus, however, may be readily adapted to the use of power supply lines having any of the standard number of phases.

What is claimed is:

In a system for synchronizing the speed of a motion-picture projector with accompanying intelligence data recorded on magnetic tape, in which said tape has inscribed thereon a record of a carrier-frequency signal modulated by the frequency pattern derived from the running power source which synchronously drove the recording camera, and said tape has also inscribed thereon a record of the intelligence data occurring simultaneously with the inscription of said frequency pattern, means simultaneously to play back both records, means to separate the two records, demodulating means to extract the frequency pattern of the running source of power from the carrier frequency, a magnetic power amplifier acting to amplify said frequency pattern, a synchronous motor connected to the output of said amplifier for driving said motion picture projector, means to reproduce said intelligence record, a plurality of sources of alternating current having frequencies above and below said running source of power and switching means selectively to connect said sources to said synchronous motor through said amplifier in place of said running source of power thereby to momentarily speed up or slow down said motor.

References Cited in the file of this patent

UNITED STATES PATENTS

| | | |
|---|---|---|
| 1,860,502 | Hanson | May 31, 1932 |
| 1,921,494 | Wildhaber | Aug. 8, 1933 |
| 2,496,103 | Neufeld | Jan. 31, 1950 |
| 2,604,321 | Williams | July 22, 1952 |
| 2,679,187 | Bitting | May 25, 1954 |
| 2,697,754 | Ranger | Dec. 21, 1954 |